(12) United States Patent
Zhang (10) Patent No.: US 7,256,559 B2
(45) Date of Patent: Aug. 14, 2007

(54) WALKING STRUCTURE OF OBJECT

(76) Inventor: Zhouxin Zhang, 37-303 Hongqiao 4 Block, Jiangyin, Jiangsu 214431 (CN)

( * ) Notice: Subject to any disclaimer, the term of this patent is extended or adjusted under 35 U.S.C. 154(b) by 0 days.

(21) Appl. No.: 10/548,499

(22) PCT Filed: Mar. 9, 2004

(86) PCT No.: PCT/CN2004/000187

§ 371 (c)(1),
(2), (4) Date: Mar. 30, 2006

(87) PCT Pub. No.: WO2004/080664

PCT Pub. Date: Sep. 23, 2004

(65) Prior Publication Data

US 2006/0214608 A1    Sep. 28, 2006

(30) Foreign Application Priority Data

Mar. 11, 2003  (CN) .............................. 03 1 12949

(51) Int. Cl.
*B60S 9/215*    (2006.01)

(52) U.S. Cl. ...................... 318/139; 180/199; 180/202
(58) Field of Classification Search ................ 318/139; 180/199–203; 901/1
See application file for complete search history.

(56) References Cited

U.S. PATENT DOCUMENTS

| | | | | | |
|---|---|---|---|---|---|
| 4,223,753 | A | * | 9/1980 | Bradbury | 180/6.2 |
| 4,644,876 | A | | 2/1987 | Thomas | |
| 4,785,899 | A | * | 11/1988 | von Winckelmann | 180/7.1 |
| 4,852,679 | A | * | 8/1989 | Fry | 180/234 |
| 4,998,595 | A | * | 3/1991 | Yeh | 180/202 |
| 5,477,937 | A | * | 12/1995 | Chagnon | 180/24.01 |
| 5,704,623 | A | * | 1/1998 | Chapman | 280/47.11 |
| 5,857,534 | A | | 1/1999 | DeVault et al. | |
| 6,123,600 | A | | 9/2000 | Yuen | |

FOREIGN PATENT DOCUMENTS

EP    0 362 159    9/1989

\* cited by examiner

*Primary Examiner*—Bentsu Ro
(74) *Attorney, Agent, or Firm*—Hamre, Schumann, Mueller and Larson, P.C.

(57) ABSTRACT

This invention is a "four-direction moving" structure that can move in all four directions without turning first. It contains two groups of wheels that are arranged perpendicular to one another, i.e. four rows of wheels form a quadrate. Within each group, the wheels turn in the same direction. The conventional circular wheels are replaced with circular eccentric or elliptical or noncircular (e.g. polygonal) wheels so that one group of wheels will not impede movement when the other group of wheels is turning by virtue of the longer diameter of the turning wheels.

5 Claims, 6 Drawing Sheets

WALKING STRUCTURE OF OBJECT

FIELD OF THE INVENTION

This invention relates to a walking structure of an object. It is mainly utilized to move a robot or other objects that are driven electromechanically.

BACKGROUND OF THE INVENTION

Figure 1:
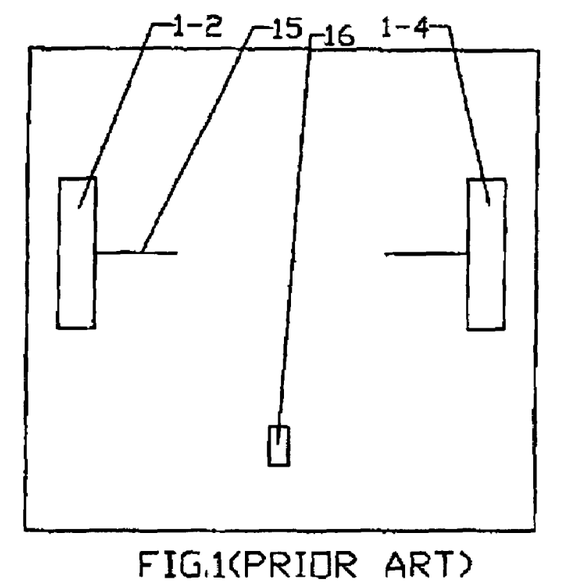
FIG. 1 illustrates the schematic diagram of arrangement of wheels of a conventional walking structure.

The conventional way to move an object with wheels on a flat surface is to install driving wheels on both the left and the right sides at the bottom of the object and with a supporting universal wheel located at the front end or rear end thereof. This structure is illustrated in FIG. 1. If the two driving wheels move in the same direction, the object goes forward or backward. When one of the driving wheels moves and the other stays still, or the two wheels move in opposite directions, the object changes its direction, turning left or right by 90 degrees, then continues to go forward or backward. The result is that the object goes to the left or right. This type of movement has significant shortcomings, that is, it has to perform an extra action to turn while changing direction. Therefore, it is both time and energy consuming. When the object just starts to move, it can only move forward or backward, that means that the object has to travel through a distance, about 0.78 of the wheel interval. Where one wheel moves and the other stays still, the object also has to go forward or backward when it just starts to move. While the two wheels move in opposite directions, the object can be seen as staying still. This kind of moving structure is called a "two direction moving" structure. Most cars, toys or other objects moving on a flat surface can only do this kind of "two direction moving."

SUMMARY OF THE INVENTION

This invention overcomes the aforesaid limitations and provides a walking structure that overcomes the aforesaid shortcomings of the "two-direction" moving structure. The new walking structure can go forward, backward, leftward or rightward directly without changing the direction turning first, and hence. In this invention, we call this walking structure can be called a "four direction" moving structure.

The purpose of this invention may be achieved by the design described below. A walking structure of an object consists of a chassis, a front driving wheel, a left driving wheel and auxiliary wheels, said front driving wheel is installed at the front most end of the chassis, the axle thereof is arranged laterally, said wheel can run forward or backward; said left driving wheel is installed at the far most left side of the chassis, the axle thereof is arranged longitudinally, said wheel can run leftward or rightward; auxiliary wheels are installed on the chassis.

The auxiliary wheels as described above comprise a rear wheel and a right wheel, said rear wheel is installed at the rear most end of the chassis, the axle thereof is arranged laterally, said wheel can run forward or backward; said right wheel is installed at the right most side of the chassis, the axle thereof is arranged longitudinally, said wheel can run leftward or rightward.

The rear wheel and the right wheel may also be driving wheels, said front driving wheel and rear driving wheel may be arranged parallelly on the chassis by a fixing supporter and connected to the front wheel and rear wheel driving mechanism; said left driving wheel and right driving wheel may be arranged parallelly on the chassis by another fixing supporter and connected to the left wheel and right wheel driving mechanism. The rear driving wheel runs synchronistically with the front driving wheel. The right driving wheel runs synchronistically with the left driving wheel.

The front, rear, left and right wheel can all be circular eccentric wheels or noncircular wheels. The front wheel and rear wheel driving mechanism and the left wheel and right wheel driving mechanism are all secured on the chassis and all comprise a motor, a driving gear, a driven belt gear, a driving belt and two belt wheels. The driving gear is installed on the axle of the motor; and said driven gear is engaged with the driving gear. The belt wheels are installed on the front and rear driving wheels and the left and right driving wheels; and said driving belt is installed on the driven belt gear and the belt wheel.

DETAILED DESCRIPTION OF THE PREFERRED EMBODIMENTS

A walking structure of an object comprise: the chassis 3, the front driving wheel 1-1, the left driving wheel 1-2 and the auxiliary wheels. Said front driving wheel 1-1 is installed at the front most end of the chassis 3; the axle thereof is arranged laterally, and said wheel can run forward or backward. Said left driving wheel 1-2 is installed at the left most side of the chassis 3; the axle thereof is arranged longitudinally; and said wheel can run leftward or rightward. The auxiliary wheels are installed on the chassis 3.

The auxiliary wheels comprise a rear wheel and a right wheel. Said rear wheel is installed at the rear most end of the chassis 3; the axle thereof is arranged laterally; and said wheel can run forward or backward. Said right wheel is installed at the right most side of the chassis 3; the axle thereof is arranged longitudinally; and said wheel can run leftward or rightward.

Figure 3:
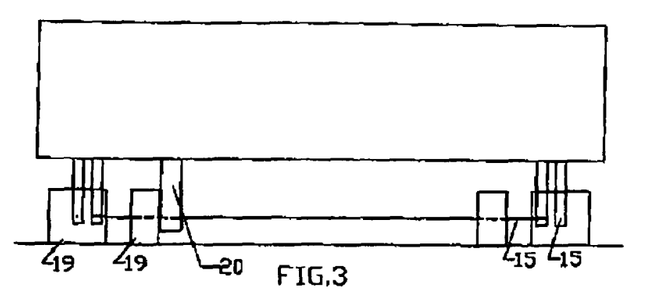
FIG. 3 illustrates one position of the quadrangular wheels in this invention.
Figure 4:
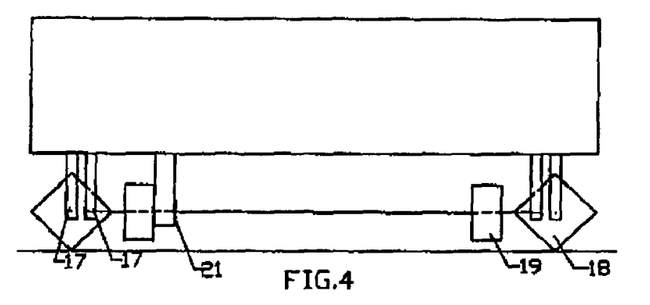
FIG. 4 illustrates another position of the quadrangular wheels in this invention.
Figure 5:
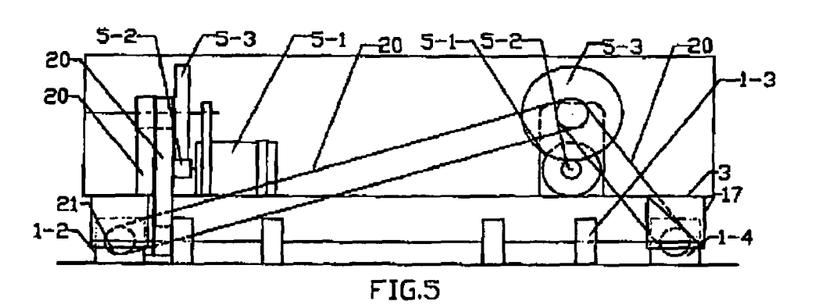
FIG. 5 illustrates the driving status in this invention.
Figure 6:
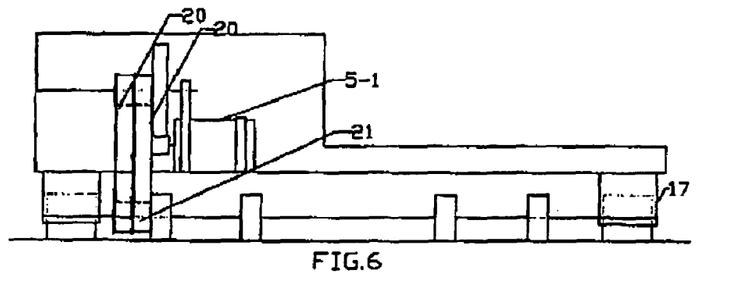
FIG. 6 illustrates the right side view of FIG. 5.
Figure 7:
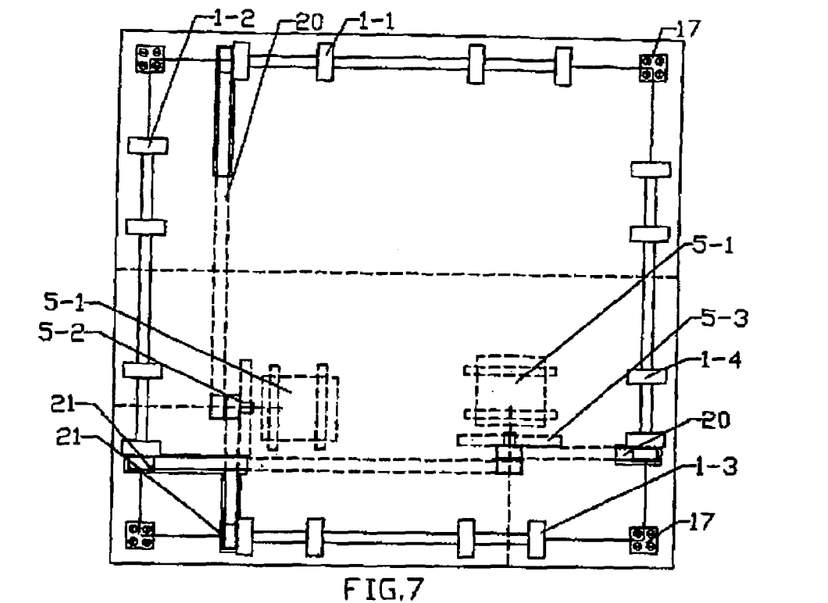
FIG. 7 illustrates the top view of FIG. 5.
Figure 8:
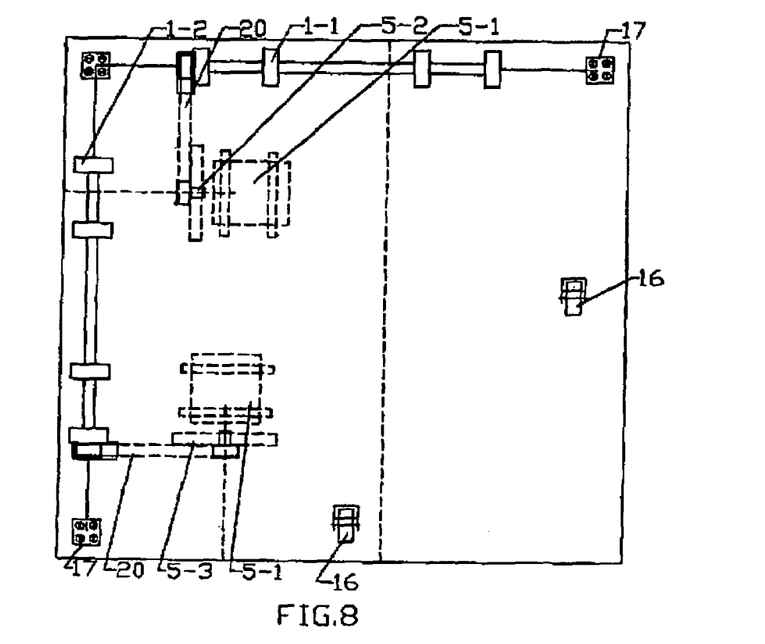
FIG. 8 illustrates an example of FIG. 7.

This embodiment of this invention is to replace the conventional circular wheels by eccentric, elliptic, polygonal, curved, star-shaped or other regular and irregular shaped noncircular wheels. Take quadrangular wheel as an example, as illustrated in FIGS. 5, 6, and 7. The driving mechanism is comprised of two motors 5-1, driving gear 5-2, driven belt gear 5-3, driving belt 20 and belt wheels 21. The driving gear 5-2 is installed on the axle of the motor 5-1: said driven gear 5-3 is engaged with the driving gear 5-2; the belt wheels 21 is installed on the front wheel 1-1, rear wheel 1-3, the left wheel 1-2 and the right wheel 1-4; and said driving belt 20 is installed on the driven belt gear 6-3 and the belt wheel 21. Motor 5-1 drives the driving wheel 5-2, and the driving wheel 5-2 then drives the driven wheel 5-3 which then drives the wheels through driving belt 20 and belt wheel 21. When the walking structure stays still, due to the inertia effect, the wheels stand on one of the edges of the quadrangle, and it is the lowest position as shown in FIG. 3. When one group of wheels start to run, the whole walking structure is elevated from the ground, the other group of wheels is also elevated from the ground, but can not run by the gravity only because it is pulled by the driving belt, as illustrated in FIG. 4. When the running wheels pass their highest position, the walking structure returns to its lowest position, another edge of the quadrangle by the gravity. Operating in this manner, the two motors run taking a turn, e.g. when one motor is running, the other is not running. Furthermore, the wheels may rotate in opposite directions. Therefore, the walking structure can run a straight line motion facing front, rear, left and right at all times without first changing its direction and distance from the surface. Since each step taken by the walking structure only travels a fixed distance, such as an edge of a polygon or half circle of an ellipse or a whole circle of an eccentric circle, a conventional direct current motor may be used to replace the expensive stepper motor. A stepper motors may be used as well. The front wheel and the left wheel may only be used as the driving wheels, while the rear wheel and right wheel may be conventional universal wheels, as illustrated in FIG. 8. One universal wheel may even be used to replace the rear wheel and the right wheel in this embodiment.

Figure 9:
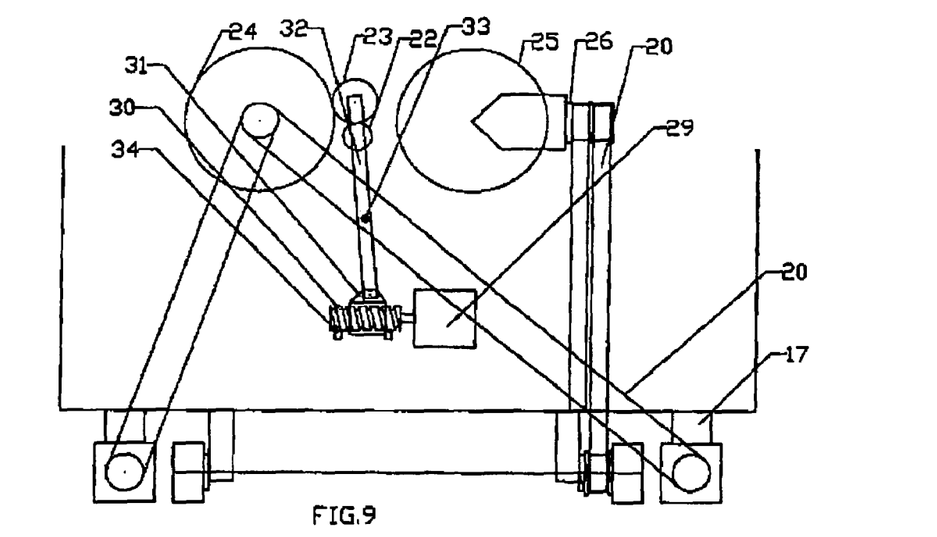
FIG. 9 illustrates the running status of the left wheel and the right wheel which are driven by only one motor in this invention.
Figure 10:
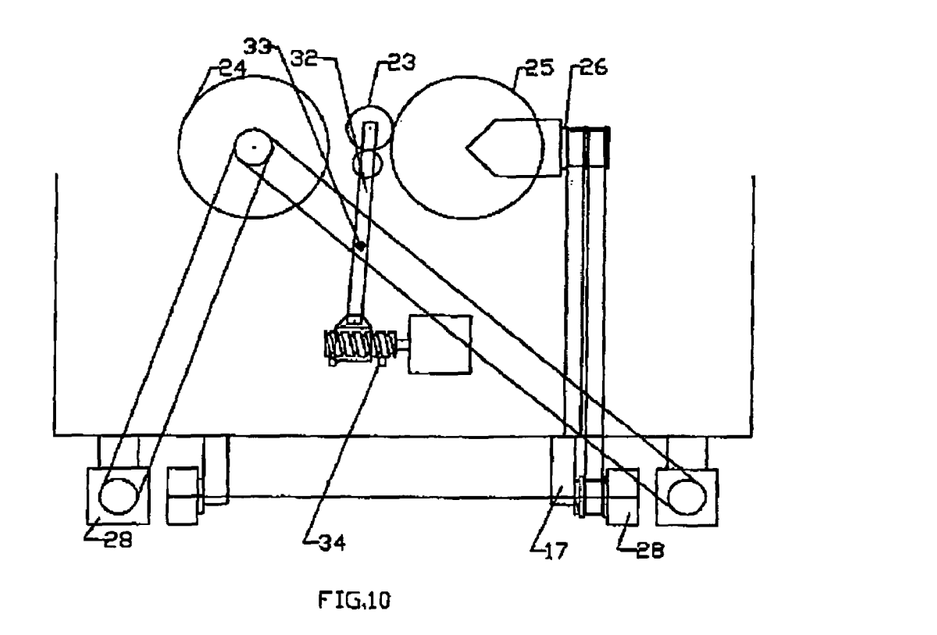
FIG. 10 illustrates the running status of the front wheel and the rear wheel which are driven by only one motor in this invention.

As illustrated in FIGS. 9 and 10, where a worm and a changeover gear driven by a magnetic valve or a small motor are used, and only one motor is needed to drive the two groups of wheels 28. Worm 30 is installed on the axle of motor 29, and nut 31 is mated with the worm 30. One end of the changeover arm 32 is hinged on the nut 31, while the other end of the changeover arm is connected with the changeover gear 23. The sliding groove in the middle thereof is positioned through a locking axle 33. The driving gear 22 is secured on the walking motor. When the small motor 29 pulls the nut 31 engaged with worm 30 near to itself, the changeover gear 23 that is secured on the other end of the changeover arm is pushed to the belt gear 24 of the left wheel and the right wheel. Under the driving of the driving gear 22, the left wheel and the right wheel start running through the belt gear 24 and the driving belt 20, as illustrated in FIG. 9. When the front wheel and the rear wheel need to run, the small motor 29 rotates in the opposite direction quickly, pushes the changeover arm 32 away from the motor 29, pulls the changeover gear 23 to the side of bevel gear 25, drives the driving gear 22 through the changeover gear 23 and bevel gear 25, drives the bevel belt gear 26 on the vertical direction and finally drives the front wheel and the rear wheel through the driving belt 20, as illustrated in FIG. 10. Small motor 29 may be a mini stepper motor, or a mini direct current motor. A sensor switch or a photoelectric switch 34 shall be installed on both sides of the nut 31 to control the motor 29 to stop at an appropriate time.

Figure 11:
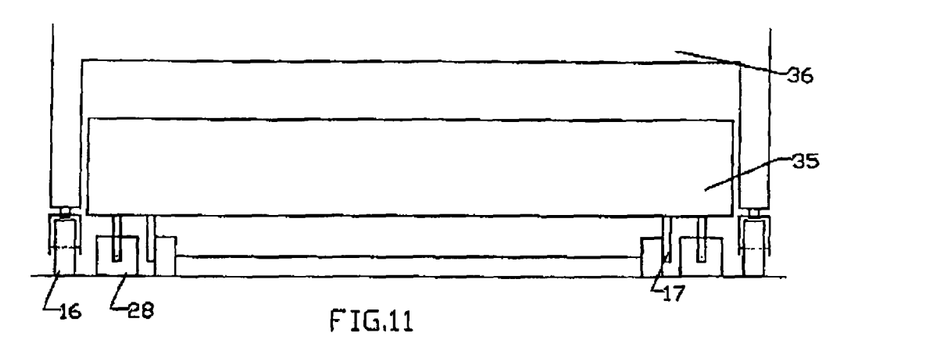
FIG. 11 illustrates the "push walking" in this invention.
Figure 12:
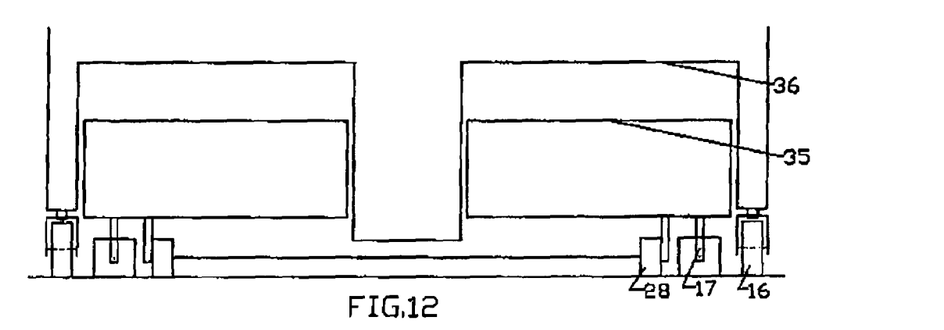
FIG. 12 illustrates the "pull walking" in this invention.

One disadvantage of the design is that the object may vibrate while walking, so some anti-vibration devices may be used to mitigate the vibration. The object may also be separated into two parts, e.g. the main body of the object 36 is one part, and the walking structure 35 the other part separated from the main body. The middle of the bottom of the object is void. Three or four universal wheels are arranged on the four edges to support the main body of the object. The walking structure is located in the middle of the bottom of the object and is just away from the main body thereof. The walking structure does not contact the main body at its highest position. It pushes or pulls the main body to walk in the four directions. If the main body first contacts the edge of the walking structure, as illustrated in FIG. 11, it is a "push." If it first contacts the middle part of the walking structure, as illustrated in FIG. 12, it is a "pull." Such arrangement is of the advantage that it is not necessary for the walking structure to raise the whole object, but only to raise the walking structure itself. Since a lower output power is used to move the object, the object will not vibrate.

Figure 2:
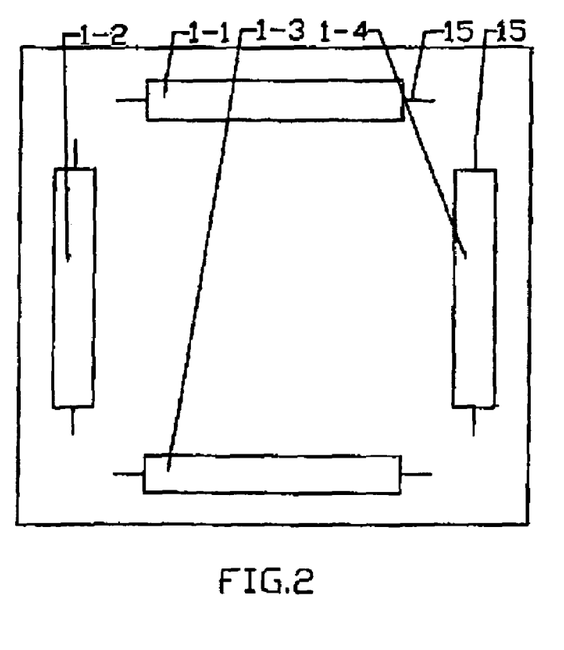
FIG. 2 illustrates the layout of the wheels of the walking structure in this invention.
Figure 13:
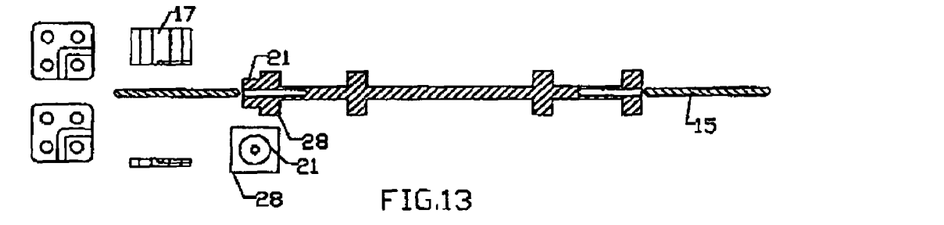
FIG. 13 illustrates the cross-sectional view of the wheel that is running whilst the axle is fixed in this invention.
Figure 14:
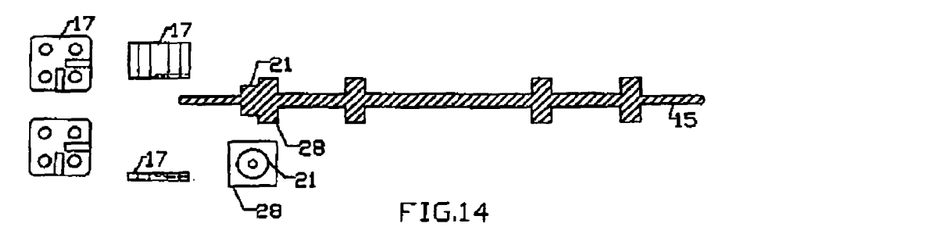
FIG. 14 illustrates the cross-sectional view of the wheel that is running with the axle thereof in this invention.

Moreover, the driving wheel described in this invention refers to the running wheels which are driven by a motor or an engine through gears, worms, chains, belts, pulleys, friction wheels etc. The synchronous belt driving described in this invention means that the axle of the wheel and the wheel may be fixed to each other, they run together on the wheel axle support, as illustrated in FIG. 14. Or one end of the axle of the wheel is secured by the wheel axle support, and the other end is inserted into the wheel, therefore, the axle stays still while the wheel is running, as illustrated in FIG. 13. FIGS. 13 and 14 use a quadrangular wheel as an example. The wheel can be one (FIG. 2), or two wheels (FIGS. 3 and 11), or several wheels arranged on the same axle (FIGS. 5 and 13). The wheels that run in the same direction are in the same group, e.g. the front wheel and the rear wheel is one group, the left wheel and the right wheel is another group. Any group of wheels shall be able to keep the whole object stable when they are grounded. If the rear wheel and the right wheel are replaced by one universal wheel, the whole object shall also be kept stable when the front wheel and the universal wheel are running or the left wheel and the universal wheel are running. For the purpose of simplification, one level of shift gear is utilized in this invention, namely only with one driven belt gear 5-3. Multi-level shift gears may be used if necessary.

In addition, the direction referred to in this invention is relative, which means the front may be the initial direction of object, or the direction after 90°, 180° or 270° turn.

One problem may exist when the walking structure is put into practice, namely it may not walk a straight line due to processing technology and non-flat ground surface. Even though the position may be remedied by some sensors, or mechanisms on the structure itself, or be remedied via colliding with a fixed object, the position remedy itself is certainly important. Some means for position remedy are described as below.

Figure 15:
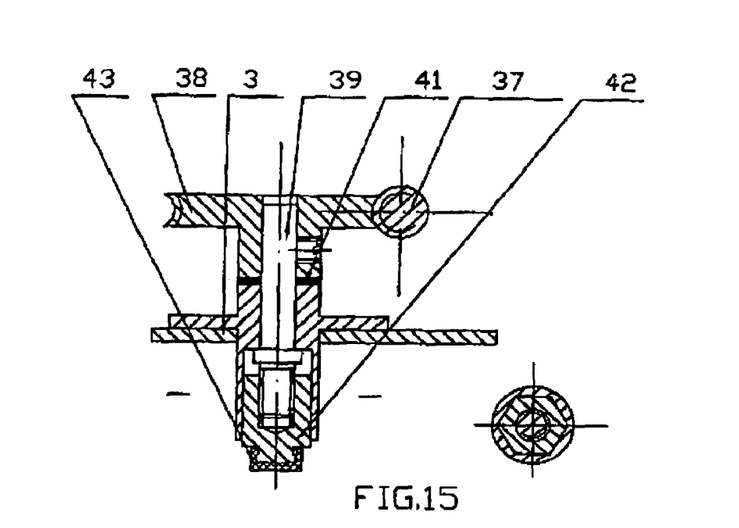
FIG. 15 illustrates the cross-sectional view of the rise and fall supporting bar situation remedy device.

One or several of the wheels or the wheel axle supporter may be designed so that it (they) can be elevated or lowered. Or, a separate conventional wheel or universal wheel 16 on the chassis or the wheel axle supporter is designed so that it can be elevated or lowered. By raising and lowering, the walking structure is tilted at the direction that is vertical to the moving direction, and so leads the direction change while moving, e.g. tilting to one direction while going forward but tilting to another direction while going backward. Or, a pin 42 lift located on the chassis or the wheel axle supporter may also be utilized in this invention. The bottom of the pin 42 lift is a kind of material of large friction efficiency, such as rubber, as illustrated in FIG. 15. When the bottom of the pin 42 lift stands on the ground while the wheels are running, the walking structure will rotate around the pin 42 lift due to the large friction at the bottom thereof. Therefore, the direction of the walking structure will so be changed. Or, one wheel or several wheels or the wheel axle support of the walking structure may also be designed so that it (they) can be pushed forward or backward, causing the initially parallel wheel axles (front and back or left and right) to become unparallel, and resulting in a change in the moving direction of the wheels. All the structures described above may be carried out through the means of a lever, compressed air, hydraulic, worm, or cam, etc.

Figure 16:
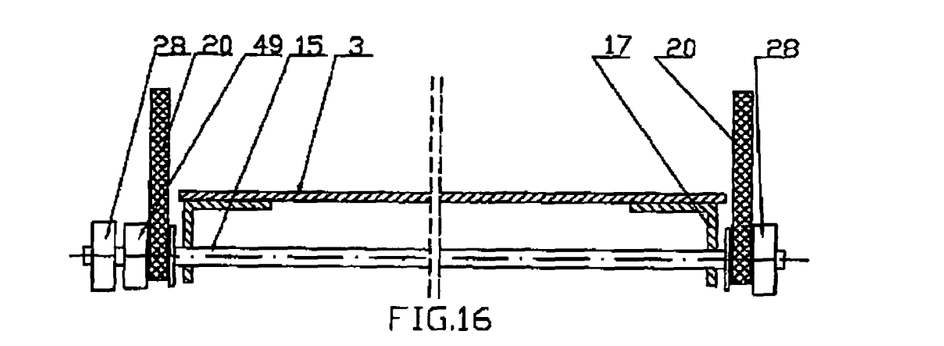
FIG. 16 illustrates a remedy device for a one-wheel driving situation in this invention.
Figure 17:
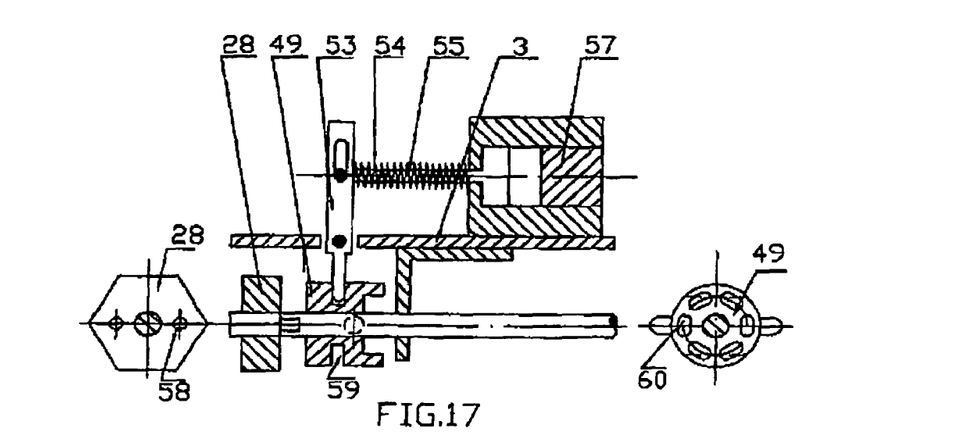
FIG. 17 illustrates the cross-sectional view of a remedy device for a relay-driven plucking fork situation in this invention.

Yet there is another example for position remedy. One or two wheels on any side (front, rear, left right) that is secured to the walking structure may be driven by a separate driving system, while another separate driving system for the wheels on the other side. Difference driving or different direction driving is used to change the moving direction of the walking structure. However, this kind of design is complicated, and the coordination of the wheels while running to the same direction is not very good. As an improvement, an eccentric or noncircular position-remedy wheel 49 may be added on one side of the wheel axle of this "four direction moving" structure. The wheel 49 is not directly secured on the wheel axle, which means when the wheels of the walking structure are running, the wheel 49 stays still, it only runs when position-remedy becomes necessary. Said wheel 49 is positioned by a locating stud only and driven by a separate driving system, as illustrated in FIG. 16. Or, said wheel 49 may slide along the wheel axle; it is plucked by a plucking fork 53 that is driven by a set of drawbars 55; and the drawbars 55 are driven by a relay 57 or a motor. A ring slot 59 is designed in the middle of the external surface of said wheel 49, and a plucking fork 53 is inserted in the slot. When the relay 57 or motor is running, said wheel 49 is plucked to the adjacent wheel 28 by the plucking fork 53 and is engaged with the driving wheel and starts running along with it. These two wheels are just next to each other; on one side of one wheel, a curved slot 60 is designed; and on the corresponding side of another wheel there are heaves 58 that match the slots. Since the major axle of said position-remedy wheel 49 is longer than that of the running wheel 28, the walking structure will tilt when the position-remedy wheel 49 lies on the ground, the direction so changes. After the position-remedy is over, the motor or the relay 57 is reset. Said relay 57 is reset via the spring 54 installed on the drawbar 55. Then the position-remedy wheel 49 is pulled away from the running wheel, and the walking structure returns to normal walking. Such position-remedy wheel 49 shall be designed so that it is heavier at the short axle and lighter at the major axle to ensure the major axle will not lie on the ground due to gravity when the walking structure moves normally, as illustrated in FIG. 17.

Some means of reducing deviation may be applied in this invention, such as increasing the friction of the wheels by covering all the wheels with rubber, keeping the axles of the wheels at the same direction parallel to each other as much as possible (except when position-remedy is necessary), improving processing technology, or arranging some locating pins or locating holes, keeping the same external diameter of the wheels at the same direction, and installing the walking structure on as flat a surface as possible. To avoid the deformation of the chassis, the reinforcing rib may be arranged at the position where the wheel axles supporter are installed, the wheel axles shall be of high strength to avoid deformation, the center of gravity shall be at the central position of the wheels which are loaded. When batteries are needed, adjust their positions and secure them.

To detect the deviation of the walking structure, the photo detection chips and the accessories of a photoelectric mouse as known can be used. Four sets of such chips and accessories can be installed at the corners or the central part of the bottom frame of the main body of universal wheel robots moved by the walking structure in this invention. Such chips and accessories shall be arranged in a symmetric manner. To install plural sets of such chips and accessories is based on consideration that the ground is not so flat. As to all kinds of the universal wheels applied in this invention, such as eccentric universal wheel, when the walking structure goes from forward or backward to leftward or rightward, very big resistance is involved, also considering inertia, it may be better to load some weight, such as batteries, on the walking structure. In addition, auxiliary running mechanism, such as bearings or balls, may be installed on the direction change axle of the universal wheels. Or, the universal wheel may be designed as a sphere universal wheel, and it lies on the ground and runs like a ball.

The invention claimed is:

1. A walking structure of an object comprising:
a chassis,
a front driving wheel,
a left driving wheel, and
auxiliary wheels,
said front driving wheel and said left driving wheel being circular eccentric wheels or noncircular wheels,
said front driving wheel being installed at a front most end of the chassis;
an axle thereof being arranged laterally,
said left driving wheel being installed at a left most side of the chassis;
an axle thereof being arranged longitudinally;
the auxiliary wheels being installed on the chassis.

2. The walking structure of an object of claim 1, wherein the auxiliary wheels comprise a rear wheel and a right wheel, said rear wheel being installed at a rear most end of the chassis, an axle thereof being arranged laterally; said right wheel being installed at a right most side of the chassis, an axle thereof being arranged longitudinally.

3. The walking structure of an object of claim 2, wherein the rear wheel and the right wheel are support wheels; the rear wheel and the right wheel being moved by pull or push of the front driving wheel and the left driving wheel.

4. The walking structure of an object of claim 2, wherein the rear wheel and the right wheel are also driving and circular eccentric or noncircular wheels, said front driving wheel and said rear wheel being arranged parallelly on the chassis by a first fixing supporter and connected to a front wheel and rear wheel driving mechanism; said left driving wheel and right wheel being arranged parallelly on the chassis by a second fixing supporter and connected to a left wheel and right wheel driving mechanism, the rear wheel runs synchronistically with the front driving wheel; the right wheel runs synchronistically with the left driving wheel.

5. The walking structure of an object of claim 4, wherein the front wheel and rear wheel driving mechanism and the left wheel and right wheel driving mechanism are secured on the chassis and each of the front wheel and rear wheel driving mechanism and the left wheel and right wheel driving mechanism comprises a motor, a driving gear, a driven belt gear, a driving belt and two belt wheels; the driving gear is installed on an axle of the motor; said driven belt gear is engaged with the driving gear; the belt wheels are installed on the front driving wheel and the rear wheel, and the left driving wheel and right wheel; said driving belt is installed on the driven belt gear and the belt wheels.

* * * * *